United States Patent
Suzuki

(10) Patent No.: US 9,466,008 B2
(45) Date of Patent: Oct. 11, 2016

(54) DEVICE AND METHOD FOR PROCESSING IMAGE

(71) Applicant: SAMSUNG DISPLAY CO., LTD., Yongin, Gyeonggi-Do (KR)

(72) Inventor: Kenji Suzuki, Yokohama (JP)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 4 days.

(21) Appl. No.: 14/563,302

(22) Filed: Dec. 8, 2014

(65) Prior Publication Data

US 2015/0161770 A1    Jun. 11, 2015

(30) Foreign Application Priority Data

Dec. 9, 2013  (JP) ................................ 2013-254511

(51) Int. Cl.
  *G06K 9/40*   (2006.01)
  *G06K 9/52*   (2006.01)
  *H04N 1/409*  (2006.01)

(52) U.S. Cl.
  CPC .............. *G06K 9/52* (2013.01); *H04N 1/4092* (2013.01)

(58) Field of Classification Search
  None
  See application file for complete search history.

(56) References Cited

U.S. PATENT DOCUMENTS

| 2003/0052981 A1 | 3/2003 | Kakarala et al. |
| 2006/0029285 A1* | 2/2006 | Hein .......................... G06T 5/50 382/260 |
| 2007/0188625 A1* | 8/2007 | Cho ........................ H04N 5/217 348/222.1 |

FOREIGN PATENT DOCUMENTS

| JP | 2000-114426 | 4/2000 |
| JP | 2000-115526 | 4/2000 |
| JP | 2009-025862 | 2/2009 |
| JP | 2009-205224 | 9/2009 |
| JP | 2010-158317 | 7/2010 |
| JP | 2010-525142 A | 7/2010 |
| JP | 2011-048592 | 3/2011 |
| WO | WO-2004/055724 A2 | 7/2004 |
| WO | WO-2010/073582 A1 | 7/2010 |

* cited by examiner

*Primary Examiner* — Feng Niu
(74) *Attorney, Agent, or Firm* — Lee & Morse P.C.

(57) ABSTRACT

An image processing device includes a line gain calculator, a line gain corrector, and a gain adjustor. The line gain calculator calculates an absolute value of Gradient and an absolute value of Laplacian of the input image, and calculates a line gain based on the absolute value of the Gradient and the absolute value of the Laplacian. The line gain corrector calculates a blend coefficient based on the input image and the line gain and to correct the line gain based on the blend coefficient. The gain adjuster processes the input image based on the corrected line gain to generate an output image.

20 Claims, 11 Drawing Sheets

DEVICE AND METHOD FOR PROCESSING IMAGE

CROSS-REFERENCE TO RELATED APPLICATION

Japanese Patent Application No. 2013-254511, filed on Dec. 9, 2013, and entitled: "Device and Method for Processing Image," is incorporated by reference herein in its entirety.

BACKGROUND

1. Field

One or more embodiments described herein relate to a device and method for processing an image.

2. Description of the Related Art

When low-resolution image data is input into a display, the display may perform an operation which involves increasing resolution. This may be accomplished, for example, by interpolating only a portion of an image having a significantly varying luminescence, e.g., an edge or contour. The edge may include step with a varying gradient, e.g., a step shape. Also, the image may include a line edge in the form of a white or black line.

When only the edge or contour is interpolated, the luminescence gradient of the edge may become dull, thereby resulting in a blur. Also, a line edge may become blunt, thereby having a wide line appearance.

Various attempts have been made to overcome these drawbacks. One attempt involves performing image processing to steepen the luminescence gradient of the edge. This processing is performed using an un-sharp mask based on a Laplacian filter. However, this may produce ringing, e.g., overshoot or undershoot.

SUMMARY

In accordance with one embodiment, an image processing device includes a line gain calculator to calculate an absolute value of Gradient and an absolute value of Laplacian of the input image, and to calculate a line gain based on the absolute value of the Gradient and the absolute value of the Laplacian; a line gain corrector to calculate a blend coefficient based on the input image and the line gain and to correct the line gain based on the blend coefficient; and a gain adjuster to process the input image based on the corrected line gain to generate an output image.

The line gain corrector may calculate the blend coefficient based on an added median generated by adding the line gain to the input image and a subtracted median generated by subtracting the line gain from the input image.

The line gain corrector may calculate the blend coefficient based on a filtered added median and a filtered subtracted median output from a filter.

The line gain corrector may calculate the blend coefficient based on a first difference between the filtered added median and the input image and a second difference between the filtered subtracted median and the input image.

The line gain corrector may determine the blend coefficient based on the following equation:

$$BR = \begin{cases} \frac{DiffM}{DiffP + DiffM} \times 2 - 1 & DiffP + DiffM \neq 0 \\ 0 & DiffP + DiffM = 0 \end{cases}$$

where BR is the blend coefficient, DiffM is the filtered subtracted median, and DiffP is the filtered added median.

The line gain may generated based on a line gain seed, and the line gain seed may be determined based on a difference between a value obtained by multiplying the absolute value of the Gradient and an enhancement adjustment parameter and the absolute value of the Laplacian. The enhancement adjustment parameter may include first and second sub adjustment parameters, and when the line gain seed has a value larger than 0, the first sub adjustment parameter is multiplied, and when the line gain seed has a value smaller than 0, the second sub adjustment parameter is multiplied.

The device may include a step gain calculator to calculate a step gain based on the absolute value of the Gradient and the absolute value of the Laplacian; and a gain adjuster to apply the step gain to the input image to generate the output image. The step gain calculator may calculate step gain based on a value determined by multiplying the absolute value of the Gradient and the Laplacian.

In accordance with another embodiment, an image processing method includes calculating an absolute value of Gradient and an absolute value of Laplacian for the input image; calculating a line gain based on the absolute value of the Gradient and the absolute value of the Laplacian; calculating a blend coefficient based on the input image and the line gain; correcting the line gain based on the blend coefficient; and processing the input image based on the corrected line gain to generate an output image.

The method may include calculating a step gain based on the absolute value of the Gradient and the Laplacian; and processing the input image based on the step gain and the corrected line gain to generate the output image.

In accordance with another embodiment, an image processing device includes a line gain calculator to calculate a line gain based on a first value and a second value of an input image; a line gain corrector to calculate a blend coefficient based on the input image and the line gain and to correct the line gain based on the blend coefficient; and a processor to process the input image based on the corrected line gain to generate an output image for display. The first value may be based on a Gradient of the input image, and the second value may be based on a Laplacian of the input image. The first value may be an absolute value of Gradient, and the second value may be an absolute value of Laplacian.

The line gain corrector may calculate the blend coefficient based on an added median generated based on a sum of the line gain and the input image and a subtracted median generated by subtracting the line gain from the input image.

The line gain corrector may calculate the blend coefficient based on a filtered added median and a filtered subtracted median output from a filter.

The line gain corrector may calculate the blend coefficient based on a first difference between the filtered added median and the input image and a second difference between the filtered subtracted median and the input image.

The line gain may be generated based on a line gain seed, and the line gain seed may be determined based on a difference between a value obtained by multiplying the first value and an enhancement adjustment parameter and the second value. The enhancement adjustment parameter may include first and second sub adjustment parameters, and when the line gain seed has a value larger than 0, the first sub adjustment parameter is multiplied, and when the line gain seed has a value smaller than 0, the second sub adjustment parameter is multiplied. The device may include a step gain calculator to calculate a step gain based on the first value and the second value; and a gain adjuster to apply the step gain to the input image to generate the output image.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
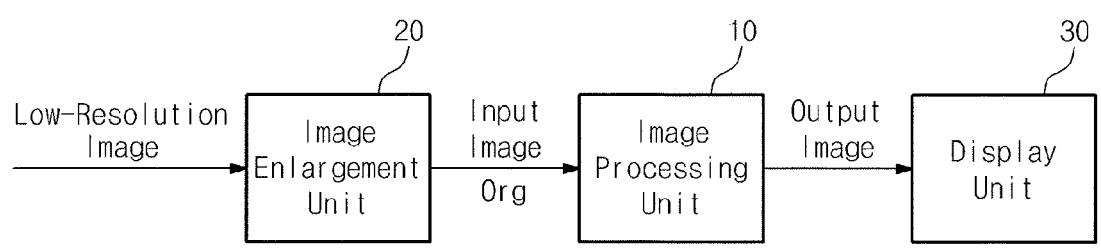
FIG. 1 illustrates an embodiment of a display device.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawings, the dimensions of layers and regions may be exaggerated for clarity of illustration. Like reference numerals refer to like elements throughout.

FIG. 1 illustrates an embodiment of a display device 1, which, for example, may display an image for a smart phone, a portable phone, a personal computer, a television, or another electronic device. The display device 1 includes an image processing unit 10, an image enlargement unit 20, and a display unit 30.

The display unit 30 has pixels arranged in a matrix, each pixel having a display element for emitting light in an image. The display unit 30 controls the display element at each pixel based on data including information on the output image to be output from the image processing unit 10. The display element may be a self-emissive element such as an organic light-emitting diode (OLED) or a non self-emissive element such as in a liquid crystal display (LCD). When the display device is included in an LCD, the display device 1 may include a backlight unit.

The image enlargement unit 20 receives an image (e.g., a low-resolution image) having a resolution lower than that of the display unit 30. The low-resolution image may include data to be processed in a digital or analog processing device.

For example, data input to the image enlargement unit 20 represents images for one screen with pixels less than those of the display unit 30. The resolution may correspond to the number of pixels for configuring images for one screen. The image enlargement unit 20 up-scales (up-converts) an input low-resolution image to a high-resolution image corresponding to the number of pixels of the display unit 30. The high-resolution image may include data to be processed in a digital or analog processing device. In one embodiment, interpolation may be used to perform the conversion. As a result of the conversion, the high-resolution image may have a duller edge in comparison to the input low-resolution image.

The image processing unit 10 receives the high-resolution image from the image enlargement unit 20. The high-resolution image may be referred to as input image Org. The image processing unit 10 sharpens the edge of the input image Org to output an image having sharpened edge. The edge sharpening may be performed to make the edge in the image clear. For example, the edge may include a step edge having a varying gradient in a step shape, and/or a line edge formed by a line such as a white line or a black line. The image processing unit 10 may previously apply a noise removing filter (e.g., a smoothing filter) to the input image Org and then sharpen the edge based on luminescence after the application.

In the following embodiment, the image processing unit 10 calculates each gain to be represented below based on the luminescence of the input image Org. In another embodiment, the image processing unit 10 may input a component signal of the input image Org in place of the luminescence of the input image Org, in order to individually calculate each gain for RGB. An image output from the image processing unit 10 may be referred to as an output image, which is displayed on the display unit 30.

Image Processing Unit 10

Figure 2:
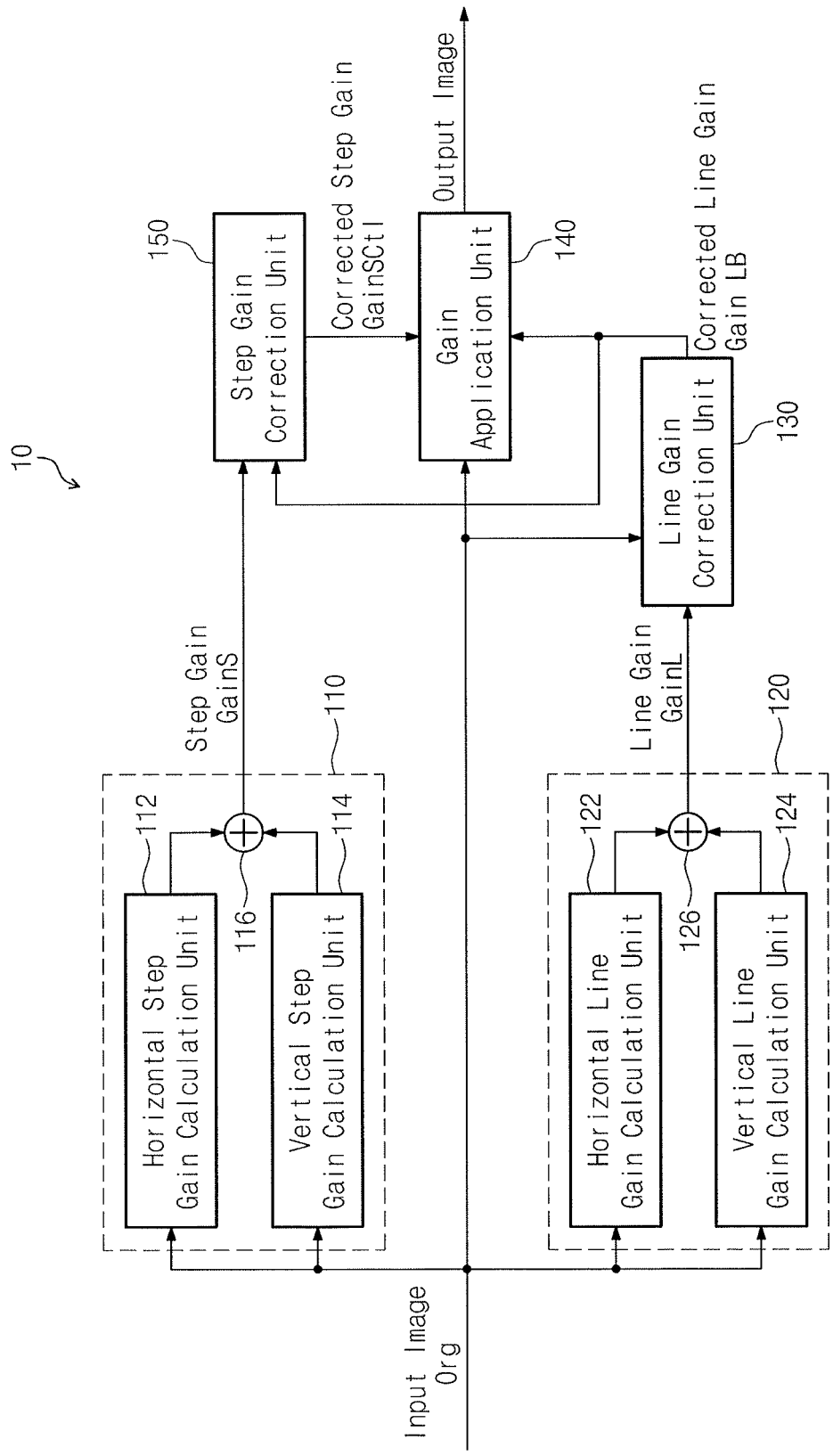
FIG. 2 illustrates an embodiment of an image processing device.

FIG. 2 illustrates an embodiment of the image processing unit 10 which includes a step gain calculation unit 110, a line gain calculation unit 120, a line gain correction unit 130, a step gain correction unit 150, and a gain application unit 140.

The step gain calculation unit 110 includes a horizontal step gain calculation unit 112, a vertical step gain calculation unit 114, and an adder 116 to add the outputs thereof. The horizontal step gain calculation unit 112 calculates a step gain of a horizontal component on a pixel on which a gain is calculated (hereinafter, referred to as a "target pixel"), with reference to a pixel adjoining in a horizontal direction (in a direction extending along a scan line).

The vertical step gain calculation unit 114 calculates a step gain of a vertical component on the target pixel, with reference to a pixel adjoining in a vertical direction (in a direction extending along a data line).

The adder 116 adds the step gain of the horizontal component to the step gain of the vertical component and outputs a step gain GainS. Step gain calculation is performed based on an expression to sharpen the step edge.

The line gain calculation unit 120 includes a horizontal line gain calculation unit 122, a vertical line gain calculation unit 124, and an adder 126 to add the outputs thereof. The horizontal line gain calculation unit 122 calculates a line gain of a horizontal component on the target pixel using a pixel adjoining in a horizontal direction.

The vertical line gain calculation unit 124 calculates a line gain of a vertical component on the target pixel by using a pixel adjoining in a vertical direction.

The adder 126 adds the line gain of the horizontal component to the line gain of the vertical component and outputs a line gain GainL. Line gain calculation is performed based on an expression to sharpen the line edge.

The line gain correction unit 130 corrects the line gain GainL based on a blend coefficient and outputs a corrected line gain GainLB. Because a gain to be applied to the line edge depends on whether there is a white line or a black line, the line gain GainL may be corrected.

The step gain correction unit 150 corrects the step gain GainS based on a step gain correction coefficient CtlS and outputs a corrected step gain GainSCtl. The step gain correction decreases the effect of the step gain on the step edge.

The gain application unit 140 applies the corrected step gain GainSCtl and/or the corrected line gain GainLB to the input image Org to generate an output image.

Step Gain Calculation

Step gain calculation is performed based on an expression in order to sharpen the step edge. Calculating the step gain of a horizontal component is described as an example. Calculation of the step gain of a vertical component may be performed with only a pixel referenced for calculation being different.

Gradient and Laplacian may be used for calculating the step gain.

Gradient may be a value obtained by subtracting the luminescence of a pixel adjacent to the right side (hereinafter, referred to as a "right-side adjoining pixel") of a target pixel from that of a pixel adjacent to the left side (hereinafter, referred to as a "left-side adjoining pixel") thereof, as represented by Equation 1.

$$grad(x) = lum(x+1) - lum(x-1) \quad (1)$$

In Equation 1, x represents the target pixel, x+1 represents a right-side adjoining pixel, and x−1 represents a left-side adjoining pixel. Grad represents Gradient and lum represents luminescence.

Laplacian may be a value obtained by subtracting two times the luminescence of the target pixel from a value obtained by adding the luminescence of the left-side adjoining pixel of the target pixel to the luminescence of the right-side adjoining pixel thereof, as represented by Equation 2, in which lap represents Laplacian.

$$lap(x) = lum(x+1) - lum(x) \times 2 + lum(x-1) \quad (2)$$

In order to normalize the absolute value of Gradient to 1, gradMax may be calculated by applying a Max filter to the Gradient. The Max filter is a maximum value of the Gradient of three pixels before the target pixel and three pixels after the target pixel (three pixels adjacent to the right side of the target pixel and three pixels adjacent to the left side thereof), for example, as represented by Equation 3.

$$gradMax(x) = \underset{-3 \leq i \leq 3}{Max} |grad(x+i)| \quad (3)$$

Figure 3:
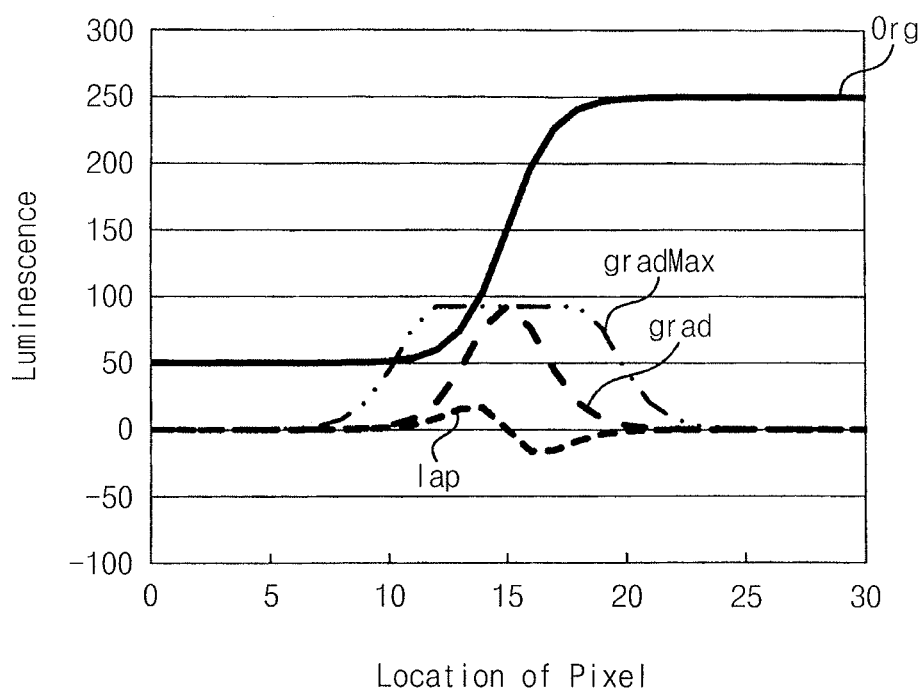
FIG. 3 illustrates an embodiment for calculating step gain.

FIG. 3 illustrates an embodiment for performing the calculation by the step gain calculation unit. In FIG. 3, Laplacian, Gradient, and gradMax are provided for when the input image Org represents step edge. These are calculated by Equations 1 to 3.

Subsequently, the step gain GainS may be calculated by multiplying a value obtained by normalizing the absolute value of the Gradient, Laplacian, and a preset parameter pStep, as represented by Equation 4. In this equation, pStep is a parameter for adjusting a level of enhancement.

$$GainS(x) = \begin{cases} lap(x) \times \dfrac{|grad(x)|}{gradMax(x)} \times pStep & gradMax(x) > 0 \\ 0 & gradMax(x) = 0 \end{cases} \quad (4)$$

Figure 4:
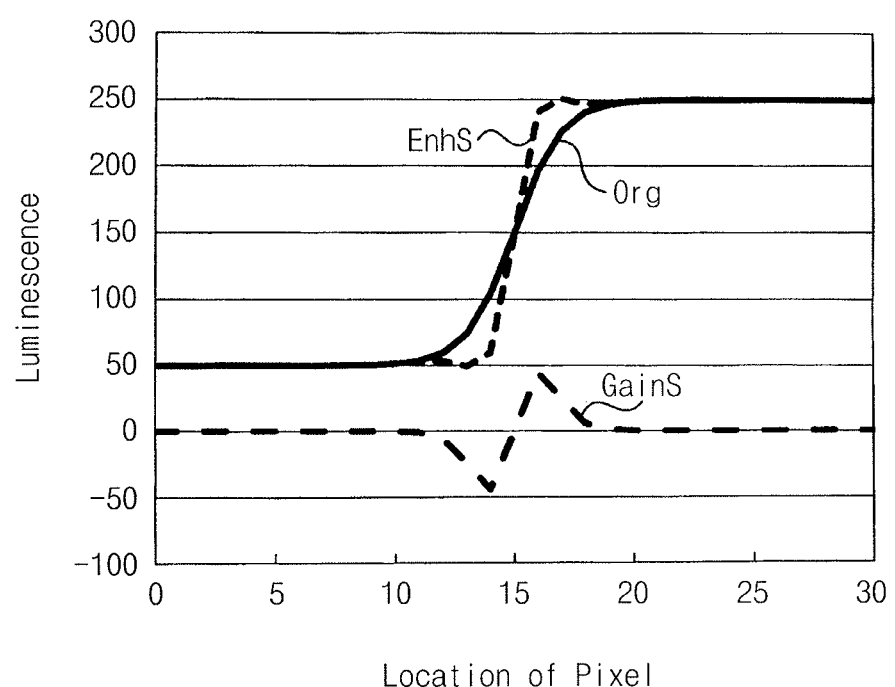
FIG. 4 illustrates an embodiment for performing step edge sharpening.

FIG. 4 illustrates an embodiment for performing step edge sharpening by a step gain. The step gain GainS in FIG. 4 is calculated by Equation 4. EnhS is luminescence when the step gain GainS is applied to the input image Org. In this example, EnhS=Org+GainS.

As described above, when calculating the step gain GainS, Laplacian is mixed with the absolute value of the Gradient. Thus, the effect of the Laplacian on the central part of the step edge increases. By the calculation method, it is possible to reduce or prevent ringing and to make the gradient of the step edge steeper, thereby sharpening the step edge. Also, because clipping is not used, it is possible to maintain an image with a natural appearance.

Calculation of the step gain is effectively applied to the step edge and has an effect of making the gradient of the line edge steep. However, regarding line edge, calculation of the step gain has no effect on narrowing linewidth. Therefore, when the step gain is added to the line edge as it is, the effect of narrowing the linewidth by the line gain decreases. In this example, the step gain correction unit 150 may correct the step gain in order to decrease the effect of the step gain on the line edge.

Line Gain Calculation

Line gain calculation is performed based on an expression in order to sharpen line edge. Calculating a line gain of a horizontal component is described as an example. Calculating the line gain of a vertical component may be performed with only a pixel referenced for calculation being different.

Like when step gain is calculated, Gradient and Laplacian are used for calculating the line gain. A line gain seed may be found by subtracting a value (obtained by multiplying the absolute value of Gradient by a preset parameter pLine1) from the absolute value of Lapliacian. The seed may be represented by Equation 5, in which pLine1 is a parameter for adjusting the ratio of peak to foot.

$$seed(x) = |lap(x)| - |grad(x)| \times pLine1 \quad (5)$$

Figure 5:
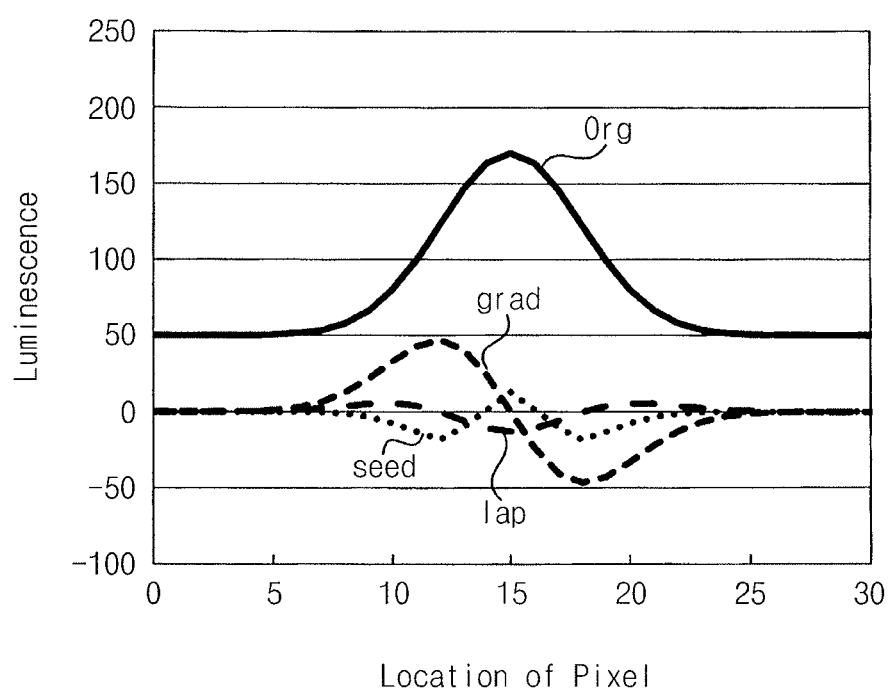
FIG. 5 illustrates an embodiment for performing line gain calculation.

FIG. 5 illustrates an embodiment for performing the calculation by the line gain calculation unit 120. In FIG. 5, Laplacian, Gradient, and seed are included when the input image Org represents line edge. These are calculated by Equations 1, 2, and 5.

Subsequently, a line gain GainL is determined by multiplying a line gain seed corresponding to a peak region by a preset parameter pLine0P, and multiplying a line gain seed corresponding to a foot region by a preset parameter pLine0M. The line gain GainL is represented by Equation 6.

$$GainL(x) = \begin{cases} seed(x) \times pLine0P & seed(x) > 0 \\ seed(x) \times pLine0M & seed(x) \leq 0 \end{cases} \quad (6)$$

In Equation 6, a region on which the line gain seed is larger than = is referred to as the peak region, and a region on which the line gain seed is smaller than or equal to ⌐0⌐ is referred to as the foot region. The parameter pLine0P adjusts a level of enhancement of the peak region, and the parameter pLine0M adjusts a level of enhancement of the foot region.

Figure 6:
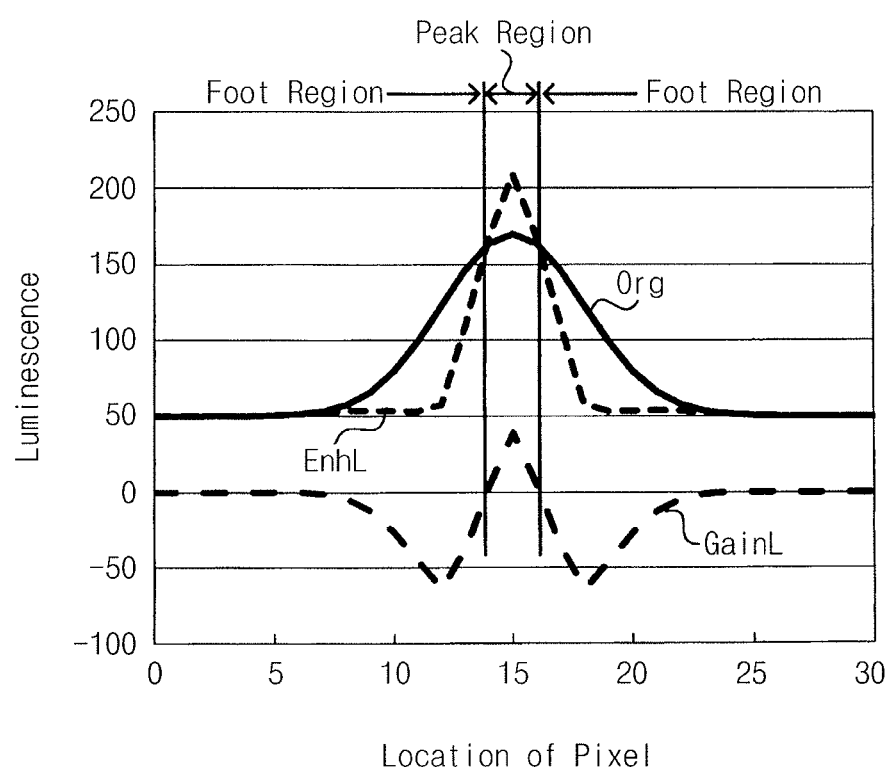
FIG. 6 illustrates an embodiment for performing step edge sharpening by line gain.

FIG. 6 illustrates an embodiment for performing line edge sharpening by a line gain. In FIG. 6, the line gain GainL is calculated by Equation 6. EnhS is luminescence when the line gain GainL is applied to the input image Org. In this example, EnhL=Org+GainL.

As described above, when calculating the line gain GainL, a certain percentage of the absolute value of Gradient is subtracted from the absolute value of Laplacian. Thus, it is possible to increase the luminescence of the peak in the vicinity of the center of the line edge, and to decrease the luminescence of the foot on a region in which luminescence gently varies because it is away from the center of the line edge. By the calculation method, it is possible to reduce or prevent ringing, make the gradient of the line edge steep for edge sharpening, and narrow linewidth. Also, because clipping is not used, it is also possible to maintain a natural appearance of the image.

Also, calculation of the line gain is effectively applied to the line edge. However, regarding the step edge, there is little effect by the line gain because a gain is substantially cancelled by the line gain correction unit 130.

The equations for calculating the step gain and the line gain as described are merely illustrative of one embodiment. In another embodiment, it is possible to perform calculations based on other equations, for example, on the condition that it is possible to obtain the same property.

When calculating Gradient or Laplacian, it is possible to consider many other methods. For example, a value may be obtained by subtracting a sum of luminescence of two right-side adjoining pixels adjacent to the left side of the target pixel from a sum of luminescence of two left-side adjoining pixels adjacent to the right side of the target pixel.

Also, a value may be obtained by subtracting a sum of luminescence of a left-side adjoining pixel adjacent to the left side of the target pixel and pixels adjacent to the up and down sides of the target pixel from a sum of luminescence of a right-side adjoining pixel adjacent to the right side of the target pixel and pixels adjacent to the up and down sides of the target pixel.

When a white line as represented in FIGS. 5 and 6 is a target, the method of calculating the line gain may be applied. However, when a black line is a target, EnhL (=Org−GainL) may be used. This is because the line gain seed calculated using the absolute value of Laplacian and the absolute value of Gradient has the same polarity irrespective of whether there is a white line or black line.

Therefore, as will be described below, the line gain correction unit 130 may correct line gain by calculating a blend coefficient representing the mixed percentage of the line gain GainL applied to the input image Org, e.g., EnhL=Org+blend coefficient×GainL. In this example, the blend coefficient is calculated to be any one of −1 to +1. In the following description, a corrected line gain GainLB has a value corresponding to blend coefficient×GainL.

Line Gain Correction Unit 130

Figure 7:
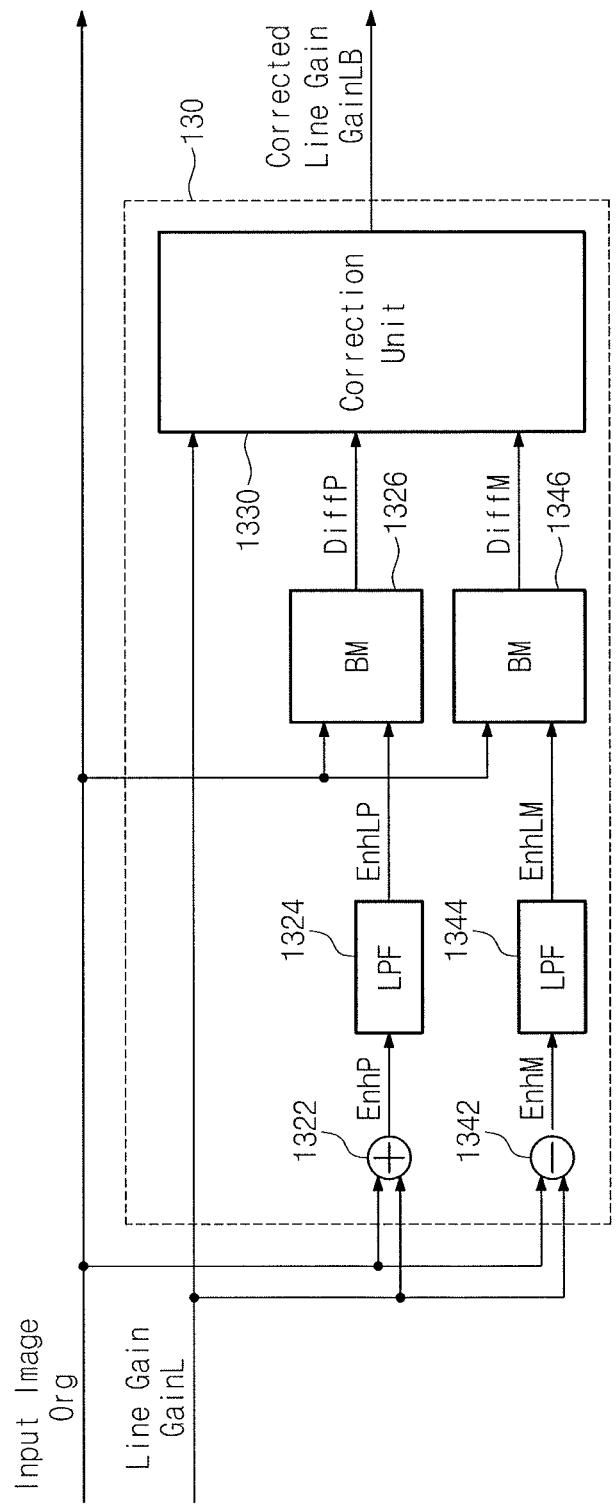
FIG. 7 illustrates an embodiment for performing line gain correction.

FIG. 7 illustrates an embodiment of the line gain correction unit 130 which includes an adder 1322, a subtractor 1342, low pass filters (LPFs) 1324 and 1344, block matching units (BMs) 1326 and 1346, and a correction unit 1330.

The adder 1322 adds the input image Org to the line gain GainL to create and output EnhP. EnhP represents luminescence when the line gain is applied, based on the assumption that the line edge is a white line. The LPF 1324 is applied to EnhP to obtain EnhLP. A parameter such as a filter coefficient is predetermined.

The BM 1326 uses block matching to calculate the difference DiffP between EnhLP and Org. For example, DiffP is calculated based on a sum of absolute difference (SAD) block matching as represented by Equation 7. As Org approaches EnhLP, DiffP becomes small. Also, various methods may be used to obtain the correlation between Org and EnhLP, e.g., sum of squered difference (SSD) block matching.

$$DiffP = \sum_{\substack{-1 \le i \le 1 \\ -1 \le j \le 1}} |LumOrg(x+i, y+j) - LumEnhLP(x+i, y+j)| \quad (7)$$

In Equation 7, LumOrg (x, y) represents the luminescence of Org in a pixel (x, y) and LumEnhLP (x, y) represents luminescence of EnhLP in the pixel (x, y).

The subtractor 1342 subtracts GainL from Org to create and output EnhM. EnhM is luminescence when a line gain is applied, based on the assumption that line edge is a black line. The LPF 1344 is applied to EnhM to obtain EnhLM. A parameter such as a filter coefficient is predetermined.

The BM 1346 uses block matching to calculate the difference DiffP between Org and EnhLM. DiffM is calculated using SAD block matching as represented by Equation 8, as BM 1326 as described above. As Org approaches EnhLM, DiffP becomes small.

$$DiffM = \sum_{\substack{-1 \le i \le 1 \\ -1 \le j \le 1}} |LumOrg(x+i, y+j) - LumEnhLM(x+i, y+j)| \quad (8)$$

Figure 8A:
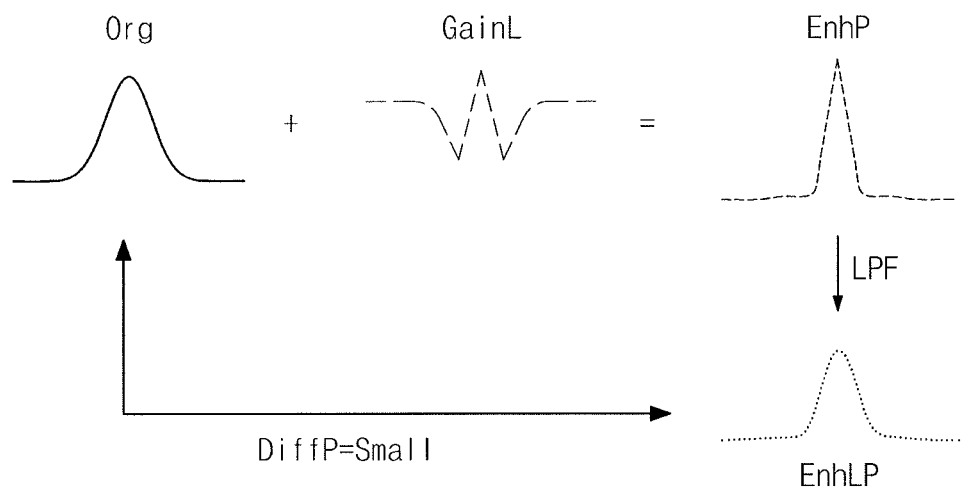
FIGS. 8A and 8B illustrate an effect of a white line when calculating a blend coefficient during an embodiment for performing line gain correction.

FIG. A illustrates an example of an effect of a white line when a blend coefficient is calculated in a line gain correction unit. In FIG. 8A, EnhP and EnhLP are created when Org is a white line and GainL is added to Org by the adder 1322.

Figure 8B:
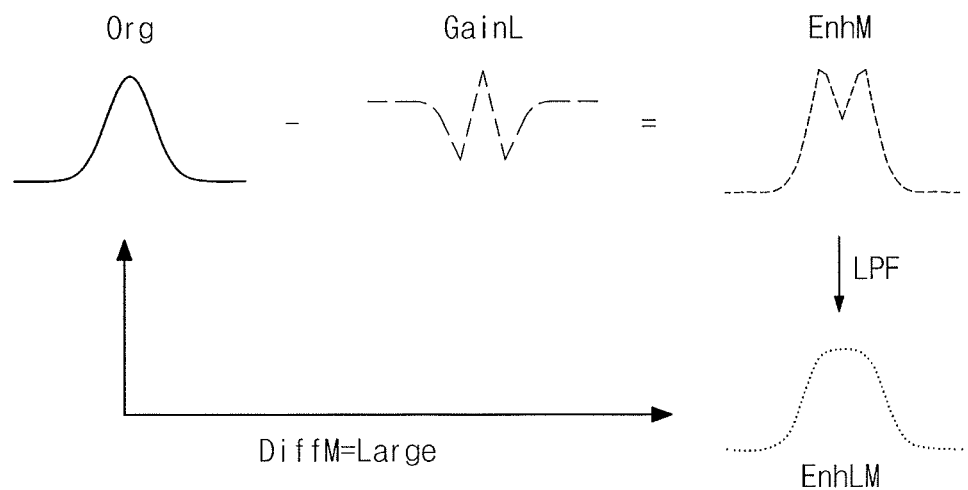

FIG. 8B illustrates EnhP and EnhLP created when Org is a white line and GainL is subtracted from Org by the subtractor 1342. DiffP is calculated when GainL is added to Org, and may be smaller than DiffM calculated when GainL is subtracted from Org.

Figure 9A:
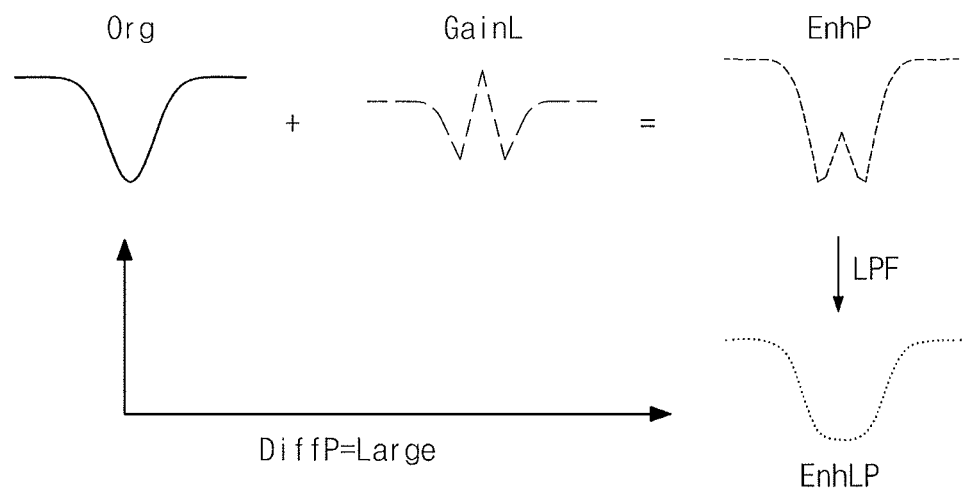
FIGS. 9A and 9B illustrate an effect of a black line when calculating a blend coefficient during an embodiment for performing line gain correction.
Figure 9B:
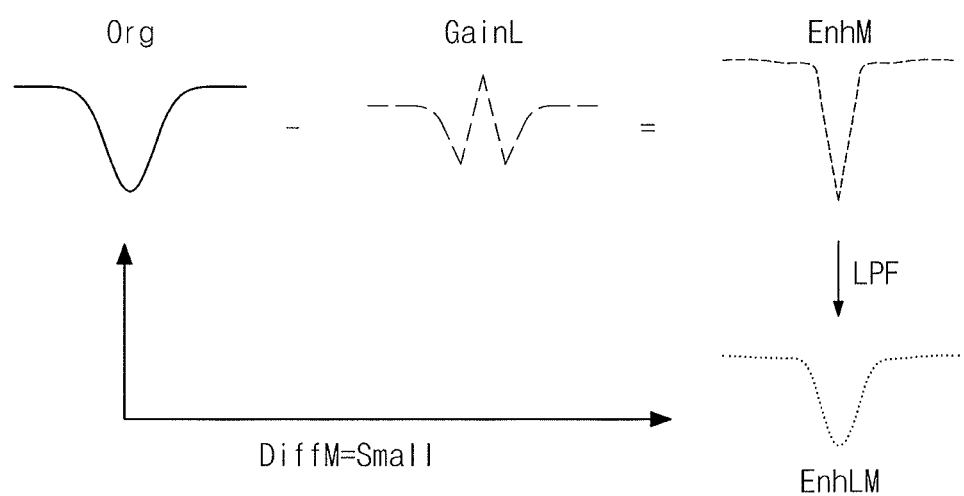

FIGS. 9A and 9B illustrate an example of an effect of a black line when a blend coefficient is calculated by a line gain correction unit. In FIG. 9A, EnhP and EnhLP are created when Org is a black line and GainL is added to Org by the adder 1322.

FIG. 9B illustrates EnhP and EnhLP created when Org is the black line and GainL is subtracted from Org by the subtractor 1342. DiffP calculated when GainL is added to Org is larger than DiffM calculated when GainL is subtracted from Org. In FIGS. 8A to 9B, as line edge becomes close to a white line, DiffP becomes small. Also, as DiffM becomes large and is close to a black line, DiffP becomes large and DiffM becomes small.

The correction unit 1330 uses a characteristic to calculate a blend coefficient. For example, referring to FIG. 7, the correction unit 1330 calculates a blend coefficient based on DiffP and DiffM and corrects GainL based on the blend coefficient. The correction unit 1330 outputs GainLB that may be obtained by correcting GainL. The blend coefficient using DiffP and DiffM may be calculated, for example, by Equation 9.

$$BR = \begin{cases} \dfrac{DiffM}{DiffP + DiffM} \times 2 - 1 & DiffP + DiffM \neq 0 \\ 0 & DiffP + DiffM = 0 \end{cases} \quad (9)$$

In Equation 9, BR is a blend coefficient and may be a value of −1 to +1. The blend coefficient BR is close to +1 when line edge is a white line, and the blend coefficient is close to −1 when the line edge is a black line. Also, as described above, when Org is step edge, DiffP and DiffM may have similar values. Thus, the blend coefficient BR becomes almost ⌜0⌟ and is hardly affected by a line gain.

The correction unit 1330 multiplies a calculated blend coefficient BR and the line gain GainL and outputs a corrected line gain GainLB (=BR×GainL). As described above, in the case of a white line, the blind coefficient is close to ⌜+1⌟. Thus, the line gain GainL is added to Org as shown in FIG. 8A. In the case of a black line, the blend coefficient BR is close to ⌜−1⌟. Thus, the line gain GainL is subtracted from Org as shown in FIG. 9B.

Step Gain Correction Unit 150

Step gain is cancelled through step gain correction when line edge is input. The step gain correction uses GainMax applying a Max filter to the absolute value of a line gain. The Max filter is a maximum value of a quadrilateral region including three pixels adjacent to the up side of a target pixel, three pixels adjacent to the down side of the target pixel, three pixels adjacent to the right side of the target pixel, and three pixels adjacent to the left side of the target pixel (a total of 12 pixels), for example, as represented by Equation 10.

$$GainLMax(x, y) = \max_{-3 \leq i \leq 3, -3 \leq j \leq 3} |GainL(x + i, y + j)| \quad (10)$$

Subsequently, a step gain correction coefficient CtlS may be determined by Equations 11 and 12. In Equation 11, the parameter pStepCtl adjusts the effect of the step gain on the line edge.

$$CtlS0(x, y) = 1 - GainLMax(x, y) \times pStepCtl \quad (11)$$

$$CtlS(x, y) = \begin{cases} CtlS0 & CtlS0 \geq 0 \\ 0 & CtlS0 < 0 \end{cases} \quad (12)$$

A corrected step gain GainSCtl is determined by multiplying the step gain GainS and the step gain correction coefficient CtlS, as represented by Equation 13.

$$GainSCtl(x,y) = GainS(x,y) \times CtlS(x,y) \quad (13)$$

Figure 10:
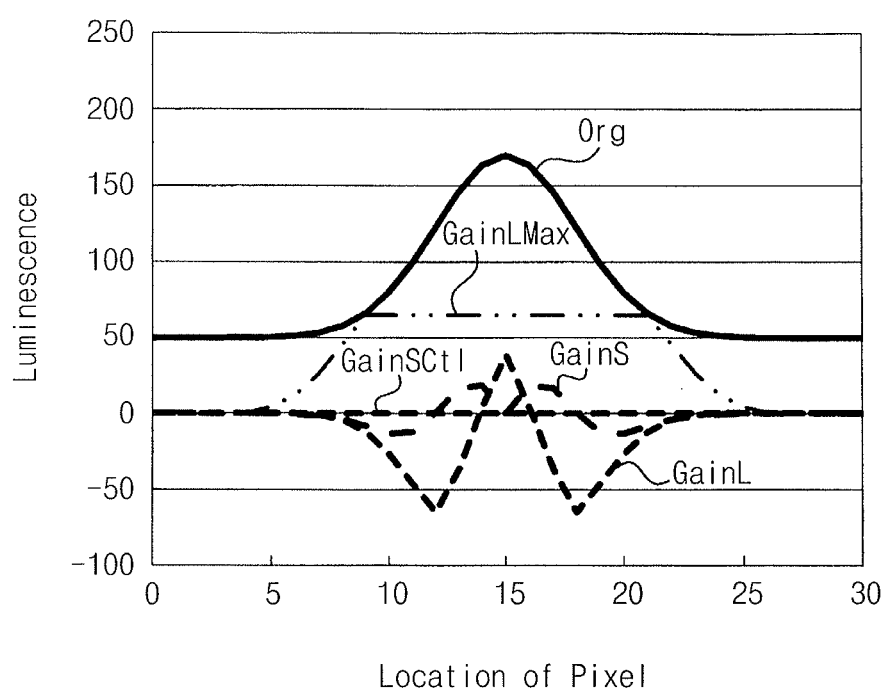
FIG. 10 illustrates an embodiment for performing step gain correction for a line gain.

FIG. 10 illustrates an embodiment for performing step gain correction on a line gain. In FIG. 10, GainL, GainS, GainLMax, and GainSCtl are represented when the input image Org represents line edge. Because the step gain correction coefficient CtlS is close to 0 near the line edge, the corrected step gain GainSCtl is a value close to 0.

Figure 11:
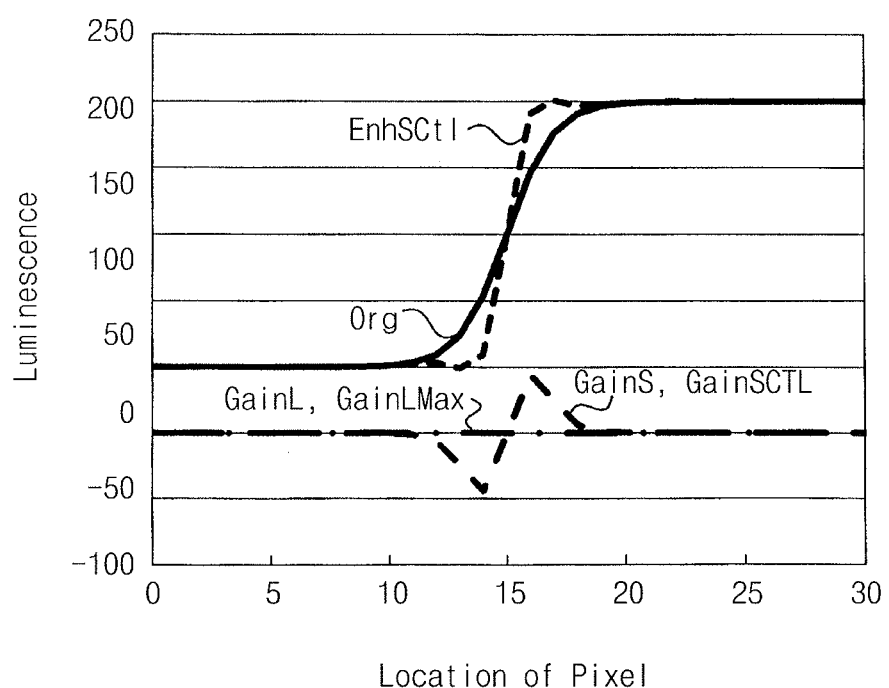
FIG. 11 illustrates an embodiment for step gain correction for a step gain.

FIG. 11 illustrates an embodiment for performing step gain correction on a step gain. In FIG. 11, GainL, GainS, GainLMax, and GainSCtl are represented when the input image Org represents line edge. As described above, because a line gain is cancelled with respect to the step edge, the step gain correction coefficient CtlS is a value close to 1 near the step edge. Accordingly, the corrected step gain GainSCtl is a value close to GainS.

Referring to FIG. 2, the gain application unit 140 applies GainSCtl and GainLB to Org and creates an output image. In this example, Org+GainSCtl+GainLB is the output image. The output image is outputted to the display unit 30.

As such, because the image processing unit 10 in this embodiment uses Laplacian and a value obtained by mixing the absolute value of Gradient in calculating the step gain, it is possible to reduce or prevent ringing and to make the gradient of step edge steeper.

Also, because a value obtained by subtracting a certain percentage of the absolute value of Gradient from the absolute value of Laplacian is used for calculating the line gain, it is possible to reduce or prevent ringing and to make the gradient of the line edge steeper to narrow linewidth.

Also, because clipping is not used, it is also possible to maintain a natural appearance of the image.

In FIG. 1, the image processing unit 10 in the display device 1 is arranged at the rear end of the image enlargement unit 20, and an example of sharpening edge on an up-scaled image is represented. In another embodiment, the image enlargement unit 20 may not be provided. In this case, the display device does not perform resolution conversion and only sharpens edge on an input image.

Also, each component of the image processing unit 10 may be implemented by executing a program. In this case, the image processing unit 10 may be a computer that includes a memory storing a program and a CPU executing the program. The program may be stored in a recording medium that may be read by the computer, such as a magnetic recording medium, an optical recording medium, an optical magnetic recording medium, and a semiconductor memory. Also, each program may also be downloaded via a network.

By way of summation and review, image processing has been performed to steepen the luminescence gradient of a edge in an image. This processing is performed using an un-sharp mask based on a Laplacian filter. However, this may produce ringing, e.g., overshoot or undershoot.

Various attempts have been made to overcome this drawback. For example, a clip processing technique may be used. However, it is difficult to set a clip level using such a technique. Also, because luminescence is clipped to a certain value, luminescence near edge becomes uniform. When the luminescence becomes uniform, an image is displayed to have an unnatural appearance, e.g., like a painted-over oil painting. In accordance with one or more of the aforementioned embodiments, an apparatus and method are provided to create an image by reducing or preventing ringing and for performing edge sharpening.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. An image processing device, comprising:
a line gain calculator to calculate an absolute value of Gradient and an absolute value of Laplacian of the input image, and to calculate a line gain based on the absolute value of the Gradient and the absolute value of the Laplacian;
a line gain corrector to calculate a blend coefficient based on the input image and the line gain and to correct the line gain based on the blend coefficient; and
a gain adjuster to process the input image based on the corrected line gain to generate an output image.

2. The device as claimed in claim 1, wherein the line gain corrector is to calculate the blend coefficient based on an added median generated by adding the line gain to the input image and a subtracted median generated by subtracting the line gain from the input image.

3. The device as claimed in claim 2, wherein the line gain corrector is to calculate the blend coefficient based on a filtered added median and a filtered subtracted median output from a filter.

4. The device as claimed in claim 3, wherein the line gain corrector is to calculate the blend coefficient based on a first difference between the filtered added median and the input image and a second difference between the filtered subtracted median and the input image.

5. The device as claimed in claim 4, wherein the line gain corrector is to determine the blend coefficient based on the following equation:

$$BR = \begin{cases} \dfrac{DiffM}{DiffP + DiffM} \times 2 - 1 & DiffP + DiffM \neq 0 \\ 0 & DiffP + DiffM = 0 \end{cases}$$

where BR is the blend coefficient, DiffM is the filtered subtracted median, and DiffP is the filtered added median.

6. The device as claimed in claim 1, wherein:
the line gain is to be generated based on a line gain seed, and
the line gain seed is determined based on a difference between a value obtained by multiplying the absolute value of the Gradient and an enhancement adjustment parameter and the absolute value of the Laplacian.

7. The device as claimed in claim 6, wherein:
the enhancement adjustment parameter includes first and second sub adjustment parameters, and
when the line gain seed has a value larger than 0, the first sub adjustment parameter is multiplied, and when the line gain seed has a value smaller than 0, the second sub adjustment parameter is multiplied.

8. The device as claimed in claim 1, further comprising:
a step gain calculator to calculate a step gain based on the absolute value of the Gradient and the absolute value of the Laplacian; and
a gain adjuster to apply the step gain to the input image to generate the output image.

9. The device as claimed in claim 8, wherein the step gain calculator is to calculate step gain based on a value determined by multiplying the absolute value of the Gradient and the Laplacian.

10. An image processing method, comprising:
calculating an absolute value of Gradient and an absolute value of Laplacian for the input image;
step for calculating a line gain based on the absolute value of the Gradient and the absolute value of the Laplacian;
step for calculating a blend coefficient based on the input image and the line gain;
step for correcting the line gain based on the blend coefficient; and
step for processing the input image based on the corrected line gain to generate an output image.

11. The method as claimed in claim 10, further comprising:
calculating a step gain based on the absolute value of the Gradient and the Laplacian; and
processing the input image based on the step gain and the corrected line gain to generate the output image.

12. An image processing device, comprising:
a line gain calculator to calculate a line gain based on a first value and a second value of an input image;
a line gain corrector to calculate a blend coefficient based on the input image and the line gain and to correct the line gain based on the blend coefficient; and
a gain adjuster to process the input image based on the corrected line gain to generate an output image for display.

13. The device as claimed in claim 12, wherein:
the first value is based on a Gradient of the input image, and
the second value is based on a Laplacian of the input image.

14. The device as claimed in claim 13, wherein:
the first value is an absolute value of Gradient, and
the second value is an absolute value of Laplacian.

15. The device as claimed in claim 12, wherein the line gain corrector is to calculate the blend coefficient based on an added median generated based on a sum of the line gain and the input image and a subtracted median generated by subtracting the line gain from the input image.

16. The device as claimed in claim 12, wherein the line gain corrector is to calculate the blend coefficient based on a filtered added median and a filtered subtracted median output from a filter.

17. The device as claimed in claim 16, wherein the line gain corrector is to calculate the blend coefficient based on a first difference between the filtered added median and the input image and a second difference between the filtered subtracted median and the input image.

18. The device as claimed in claim 12, wherein:
the line gain is to be generated based on a line gain seed, and
the line gain seed is determined based on a difference between a value obtained by multiplying the first value and an enhancement adjustment parameter and the second value.

19. The device as claimed in claim 18, wherein:
the enhancement adjustment parameter includes first and second sub adjustment parameters, and
when the line gain seed has a value larger than 0, the first sub adjustment parameter is multiplied, and when the line gain seed has a value smaller than 0, the second sub adjustment parameter is multiplied.

20. The device as claimed in claim 12, further comprising:
a step gain calculator to calculate a step gain based on the first value and the second value; and
a gain adjuster to apply the step gain to the input image to generate the output image.

* * * * *